United States Patent [19]

Petajan

[11] Patent Number: 4,975,960
[45] Date of Patent: Dec. 4, 1990

[54] ELECTRONIC FACIAL TRACKING AND DETECTION SYSTEM AND METHOD AND APPARATUS FOR AUTOMATED SPEECH RECOGNITION

[76] Inventor: Eric D. Petajan, 25 Cypress St., Millburn, N.J. 07041

[21] Appl. No.: 741,298

[22] Filed: Jun. 3, 1985

[51] Int. Cl.$^5$ .......................... G10L 7/08; G06K 9/00
[52] U.S. Cl. ........................................ 381/43; 382/2
[58] Field of Search ..................... 381/41–45; 364/513.5, 518, 521; 358/125–126, 96; 382/1, 2, 6, 10, 16, 19, 22–23, 25, 28, 30, 48

[56] References Cited

U.S. PATENT DOCUMENTS

| 3,192,321 | 3/1965 | Nassimbene | 381/41 |
| 3,383,466 | 8/1968 | Hillix et al. | 381/43 |
| 3,829,614 | 8/1974 | Ahlbom et al. | 358/126 |
| 3,903,357 | 9/1975 | Woolfson et al. | 358/126 |
| 3,953,669 | 4/1976 | Saccomani et al. | 358/126 |
| 4,286,115 | 8/1981 | Sakoe | 381/43 |
| 4,405,940 | 9/1983 | Woolfson et al. | 358/126 |
| 4,449,189 | 6/1984 | Feix et al. | 364/513.5 |
| 4,546,383 | 10/1985 | Abramatic et al. | 358/96 |
| 4,566,126 | 1/1986 | Miyagawa et al. | 382/48 |
| 4,757,541 | 7/1988 | Beadles | 381/43 |

OTHER PUBLICATIONS

Rosenfeld, "Digital Picture Processing", Academic Press 1976, pp. 194–195.
Huang, "Coding of Two-Tone Images", IEEE Trans. on Comm., vol. COM-25, No. 11, 11/77, pp. 1406–1424.
Herron et al., "Biomedical Image Processing for Dental Facial Abnormalities", Proc. Int. Conf. Cybernetic and Society, 9/77, pp. 462–464.
Harmon, "The Recongition of Faces", Scientific American, Nov. 1973, pp. 71–82.
Lubinski et al., "Microprocessor-Based Interface Converts Video Signals for Object Tracking", Computer Design, Dec. 1977, pp. 81–87.
Picture Processing System by Computer Complex and Recognition of Human Faces, part of a doctoral thesis submitted to Department of Information Science, Kyoto University, Kyoto, Japan, Takeo Kanade.

Primary Examiner—Dale M. Shaw
Assistant Examiner—John A. Merecki
Attorney, Agent, or Firm—Sutherland, Asbill & Brennan

[57] ABSTRACT

The apparatus includes circuitry for obtaining a video image of an individual's face, circuitry for electronically locating and tracking a first feature, such as the nostrils, of the facial image for use as reference coordinates and circuitry responsive to the reference coordinates for locating and tracking a second facial feature, such as the mouth, of the facial image with respect to the first feature. By tracking the location of the nostrils, the apparatus can follow the movement of the mouth, and thereby automatically recognize speech. In a preferred embodiment, the video image is grayscale encoded and the raster lines are smoothed to eliminate noise. The transitions between gray levels of the smoothed image are encoded and the resulting transition code is used to form a contour map of the image from which region parameters are computed which can be compared against stored speech templates to recognize speech. In the preferred embodiment, acoustic speech recognition is combined with visual speech recognition to improve accuracy.

94 Claims, 8 Drawing Sheets

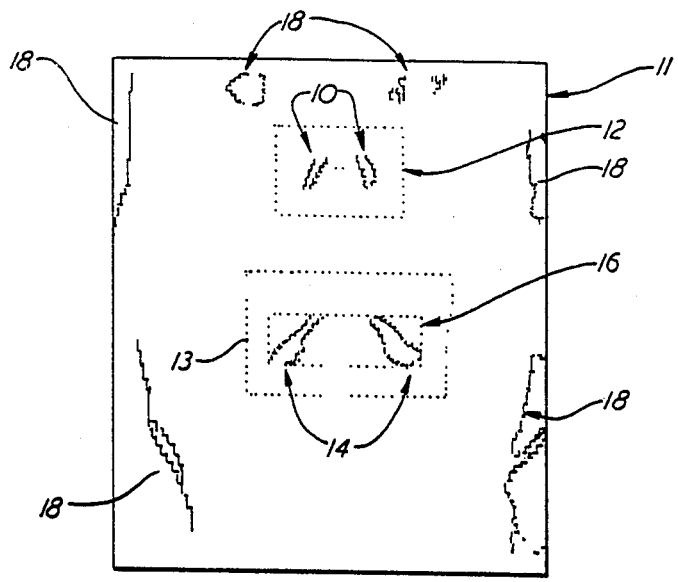
FIG. 3
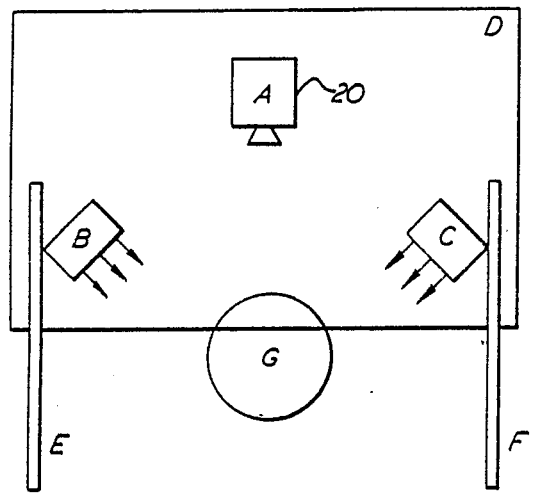
FIG. 7
FIG. 8

ELECTRONIC FACIAL TRACKING AND DETECTION SYSTEM AND METHOD AND APPARATUS FOR AUTOMATED SPEECH RECOGNITION

BACKGROUND OF THE INVENTION

1. Field of the Invention

The present invention relates to an apparatus and method for electronically tracking and detecting facial features and apparatus and methods for automatic speech recognition.

2. Description of the Related Art

There are many circumstances where it would be desirable to electronically analyze an individual's facial features. For example, automatic speech recognition devices, access control systems, electronic storage and retrieval systems for personal profiles and medical/dental screening systems could make use of such analysis techniques. Speech recognition systems which utilize analyses of facial features may find wide application in noisy environments where it is difficult to utilize acoustic speech recognition alone, e.g., in a military aircraft or in a factory. The problem, however, has been the lack of an effective means for accurately translating an individual's facial features into useful electronic data. This is particularly problematic where the individual is continually changing facial orientation with respect to the detection equipment.

There are two primary approaches to electronically detecting facial features. The first approach involves mechanically mounting an apparatus to the individual's face. One example of this approach is a system being developed at the Massachusetts Institute of Technology which requires attaching physical sensors or strain gauges to face. U.S. Pat. No. 3,192,321, a variation on the theme of face-mounted detectors, describes placing a cup-shaped detector over an individual's mouth. In the detector, there are several point sources of light and photo resistors which monitor lip movements. The pattern of detected lip movements is compared with a previously recorded pattern so as to recognize speech. Because the detectors of these systems are manually attached to the individual's face, they cannot properly be characterized as an electronic tracking system. This approach merely provides a detection system.

A second approach involves projecting a grid of light onto an individual's face and detecting the extent to which the grid is distorted by the contours and features of the individual's face. Such an approach is described in J. Herron et al., "Biomedical Imaging Processing For Dental Facial Abnormalities", *Proceedings For The International Conference On Cybernetics And Society,* Washington D.C., IEEE Systems Man & Cybernetics Society, Sept. 19-21, 1977 at pages 462-464; and U.S. Pat. No. 4,449,189. This approach may be used for detecting facial features.

Neither of the above approaches is particularly versatile. For example, it would not be practical to incorporate one of these systems in a speech recognition system to caption automatically a television news broadcast. Requiring that the newscaster either have his mouth covered with a face mounted detector or be lighted with light stripes would be highly intrusive. Thus, where intrusiveness has precluded the prior art systems, electronic speech recognition had been forced to rely on acoustic recognition devices which are of limited accuracy.

Accordingly, it is an object of the present invention to provide a more versatile system for electronically tracking and detecting facial features.

It is yet another object of the present invention to provide a system for analyzing facial features to provide information from the detected features.

It is a further object of the present invention to incorporate such a system into a speech recognition apparatus.

Other objects, features and advantages of this invention will be apparent to those skilled in the art of pattern analysis and recognition from the problems which this invention solves, and from the following summary, drawings and detailed description of the invention and its preferred embodiment.

SUMMARY OF THE INVENTION

This invention uses a video camera to scan an individual's face. The shades of gray on the video image are quantified. A computer searches the video image for the gray regions which correspond to the individual's nostrils. The nostrils are then used as reference coordinates to locate other facial features and to track movement of the face. To expedite data processing and to eliminate redundant information, the computer electronically forms a window around the nostrils of the gray scaled image. A window may also be used for isolating such other features as the eyes or mouth.

In the preferred embodiment, this tracking system is used for speech recognition. Accordingly, once the nostril window has been set, it is used as a benchmark from which a second window is electronically constructed. The second window encompasses the gray regions which correspond to the speech varying portion of an individual's face, generally, the area around the mouth. As the individual speaks, there is a change in the shape of the gray regions which correspond to the speech varying portion of the individual's face. Templates of these gray areas, stored in a computer memory, are used for pattern matching to identify the various words constituting speech. This system preferably is used in combination with an acoustic speech recognizer to provide accuracy unattainable with either a visual or acoustic system alone. The nostril tracking system continually provides the reference coordinates to account for changes in the position of the individual's face with respect to the video camera.

According to one aspect of the present invention, an apparatus for electronically detecting and tracking an individual's facial features is provided comprising means for obtaining a video image of the individual's face, means for locating and tracking a first feature of the facial image for use as a reference coordinate and means responsive to the reference coordinate for locating and tracking a second facial feature of the facial image with respect to the first feature.

According to another aspect of the present invention, a method for electronically detecting and tracking an individual's facial features is also provided.

This invention is the subject of the applicant's electrical engineering Ph.D. thesis, which is attached hereto as Appendix I and in the file of this application: Eric Petajan, "Automatic Lipreading to Enhance Speech Recognition," University of Illinois, 1984.

Although the facial feature tracking system is shown in the preferred embodiment of a speech recognition device, other applications will be apparent to those skilled in the art of electronic pattern recognition. For example, the tracked first feature, which preferably is the individual's nostrils, can be used as reference coordinates for automatic diagnosis of dental problems, or for making other medical measurements. Alternatively, the detection and tracking system of the invention may be employed for accurately measuring facial features for computer assisted face recognition. When incorporated into a speech recognition machine, the facial feature tracking system can be used for the diagnosis of neurological or speech problems. Although this invention is considerably broader than its use in a speech recognition system, this application of the invention is used to teach a best mode or embodiment and to show how to implement the invention.

BRIEF DESCRIPTION OF THE DRAWINGS

The invention will be described in the following detailed description with reference to the accompanying drawings forming part of this specification, wherein:

FIG. 3 illustrates a facial image after raster smoothing, transition, contour and region coding and showing the nostril tracking window and mouth window;

FIG. 7 shows one form of the lighting and camera arrangement; and

FIG. 8 shows the ten possible transition types possible during transition coding of the video image.

DETAILED DESCRIPTION OF THE INVENTION AND ITS PREFERRED EMBODIMENT

Figure 1:
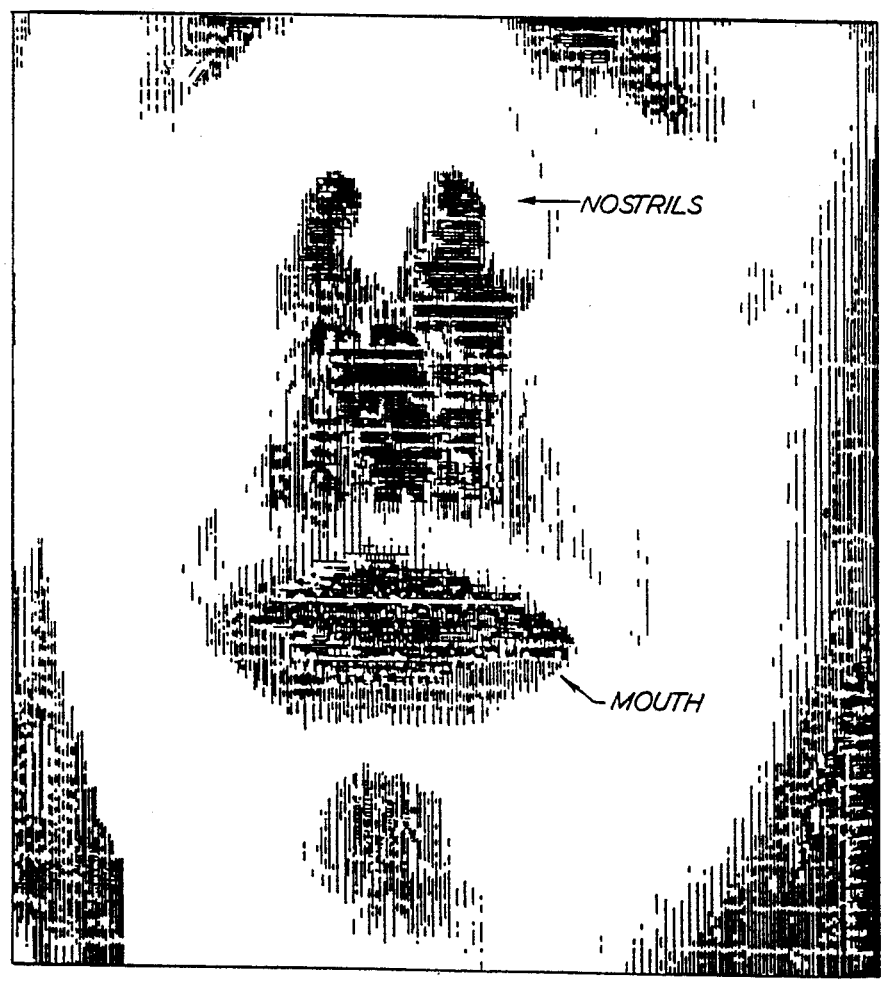
FIG. 1 is an unsmoothed video scan of a facial image.
Figure 1A:
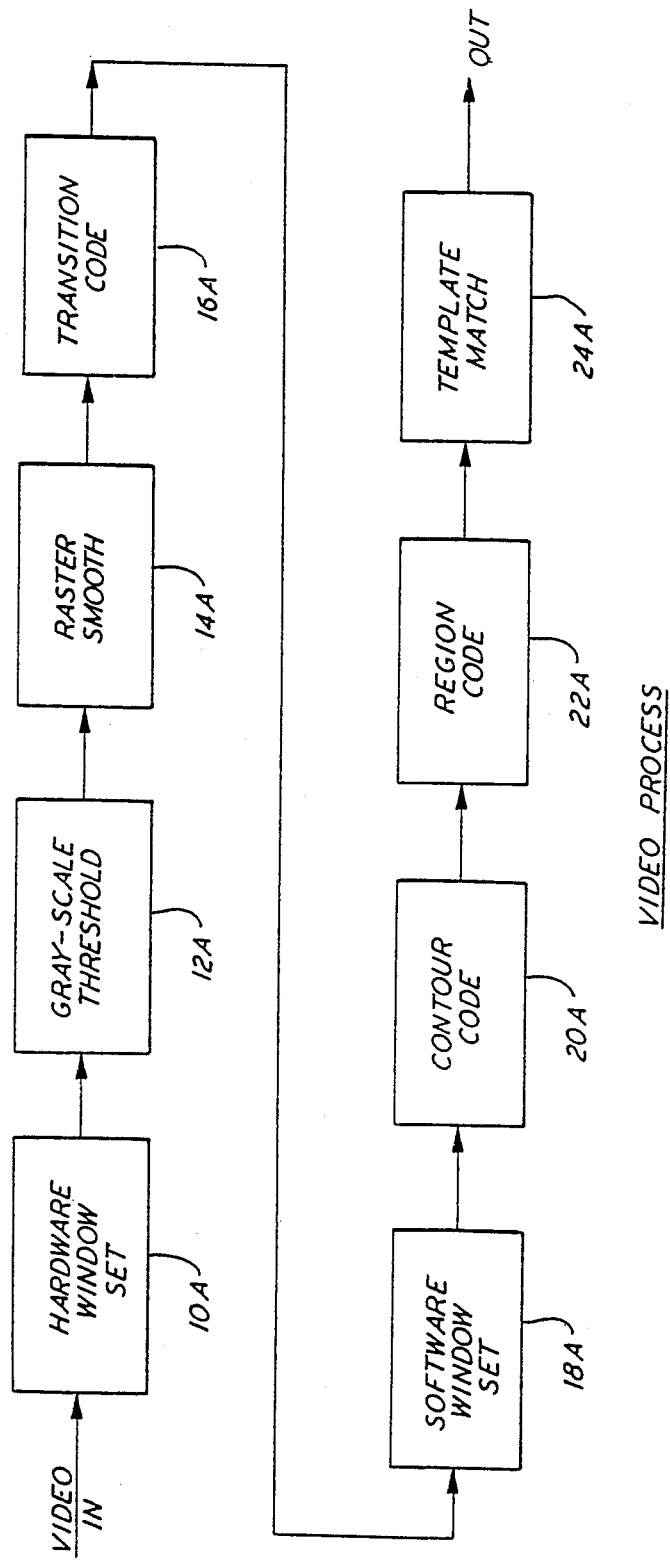
FIG. 1A is an overall block diagram of the video processing performed by the present invention.

With reference now to the drawings, FIG. 1A shows an overall block digram of the video processing performed by the apparatus of the present invention. Raw video information from a video camera, to be described in greater detail later, first is analyzed to mask out data which does not fall within a rectangular area of interest. This is shown by block 10A in FIG. 1A, labeled hardware window set. This setting of a window preferably is performed by hardware. Once the window of interest has been set, the video image is grayscale encoded. In a preferred embodiment, 4 level grayscale encoding is utilized. This is shown by block 12A. After grayscale encoding, the individual raster lines of the video image are smoothed to eliminate noise signals as shown by block 14A. This also results in a video image which can more easily be handled by a small digital computer due to the reduction in the amount of data in the video signal. After raster smoothing, a matrix of adjacent picture elements, preferably a 2×2 matrix of adjacent picture elements, is analyzed to determine the gray level transition type of the matrix from amongst a plurality of possible transition types, as shown by block 16A. As indicated by block 18A, a window is set by software to determine those regions having features which are significant for both the establishment of a reference coordinate system, e.g., the nostrils, and the isolation of those portions of the image which bear significant speech information, i.e., the mouth region. Neighboring transition types may then be combined such that continuous contours can be constructed by contour coding programs as indicated by block 20A. At 22A, a region coding process is performed. By region coding, the regions of the facial image comprising equal grayscale values are established. At the same time, region parameters are calculated. These parameters include the area of the region, the perimeter length of the region, and the maximum horizontal and vertical extents of the region. These parameters are the basic lip or mouth parameters which are matched against templates stored in memory to determine the particular words spoken. Template matching is then performed, as indicated by block 24A in FIG. 1A. The output of the template matching process is an indication of the recognized word spoken.

Figure 2:
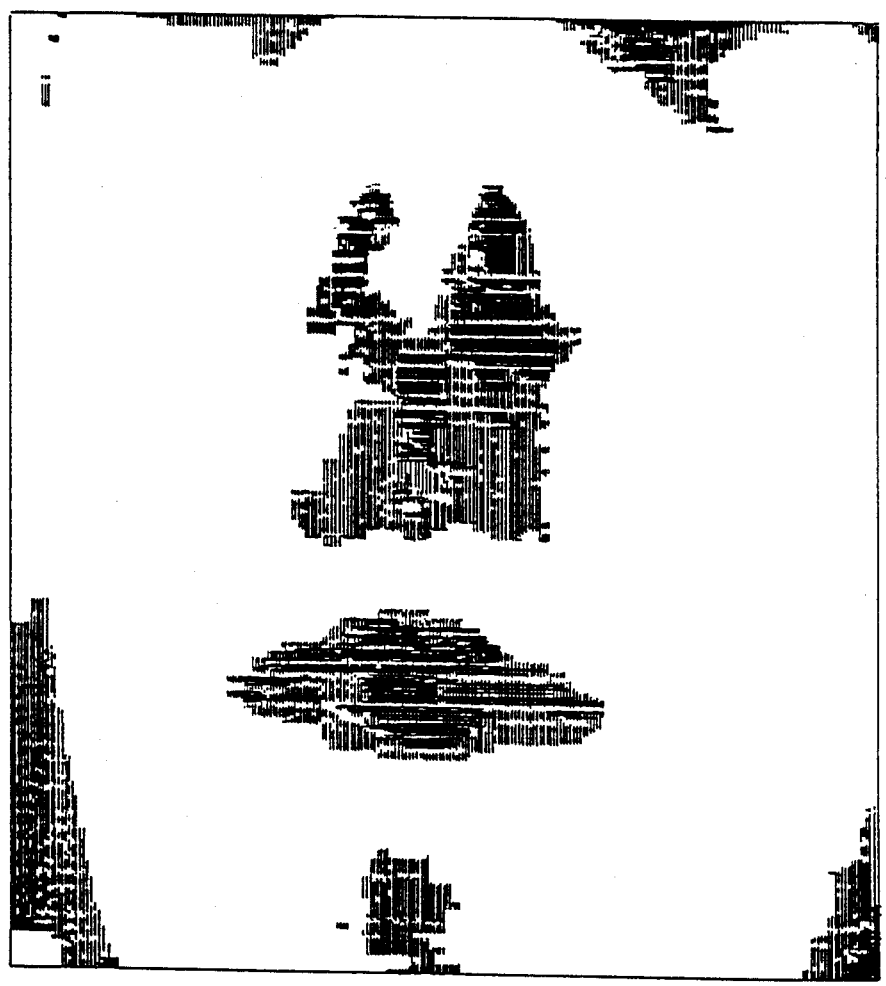
FIG. 2 is a video scan of a facial image after raster smoothing to eliminate noise signals.

FIG. 1 shows an unsmoothed video scan of a facial image taken by a video camera according to the present invention. The video scan has been subjected to four levels of gray scale encoding. As shown in FIG. 1, the nostril and mouth areas are clearly visible in the video scan. More information is present in this video scan than is necessary, however, to locate the nostrils and mouth of the individual. Additionally, noise signals are present. Accordingly, the present invention provides apparatus for eliminating the redundant information and noise in the video scan. FIG. 2 shows a scan of the video image of FIG. 1 which has been subjected to a raster smoothing process wherein noise has been eliminated. This will be explained in greater detail below, but the basic raster smoothing process operates by changing the gray level of pixel runs (pixels in a row) with less than a certain length to the gray level of neighboring pixels, and in particular, the pixel to the left at any particular instant in time. As shown, even after raster smoothing, the nostril and mouth areas are easily recognized. In FIG. 2, pixel runs comprising three or more pixels of equal intensity have been maintained.

FIG. 3 shows a facial image which has been subjected to gray scale thresholding, raster smoothing, transition coding, contour coding and region coding to locate only important facial features, i.e., the nostrils and mouth. Reference numeral 11 indicates the hardware window which defines the area of interest. The dark lines inside window 11 show the transition edges between two shades of gray. A computer scans this image into memory and locates the nostrils 10, which appear as two regions on the face. The size and orientation of the nostrils are observed and a data window 12 is constructed around the nostrils for the first video frame. Using the nostrils 10 as reference coordinates, a second data window 13 is constructed around the mouth region 14. The computer scans the data window 13 for dark regions which correspond to the mouth region 14. Thus, the computer can effectively ignore other types of facial features 18, for example, the eyes. In successive frames, a search for the nostrils is only conducted within the previously determined window 12. When the head of the individual moves, the window 12 is updated accordingly, thus establishing a changed reference coordinate system, which allows the mouth region to be tracked. The computer analyzes the mouth region 14, determining a number of mouth region parameters, to be described later, which are matched against templates of word sequences stored in memory.

Figure 4:
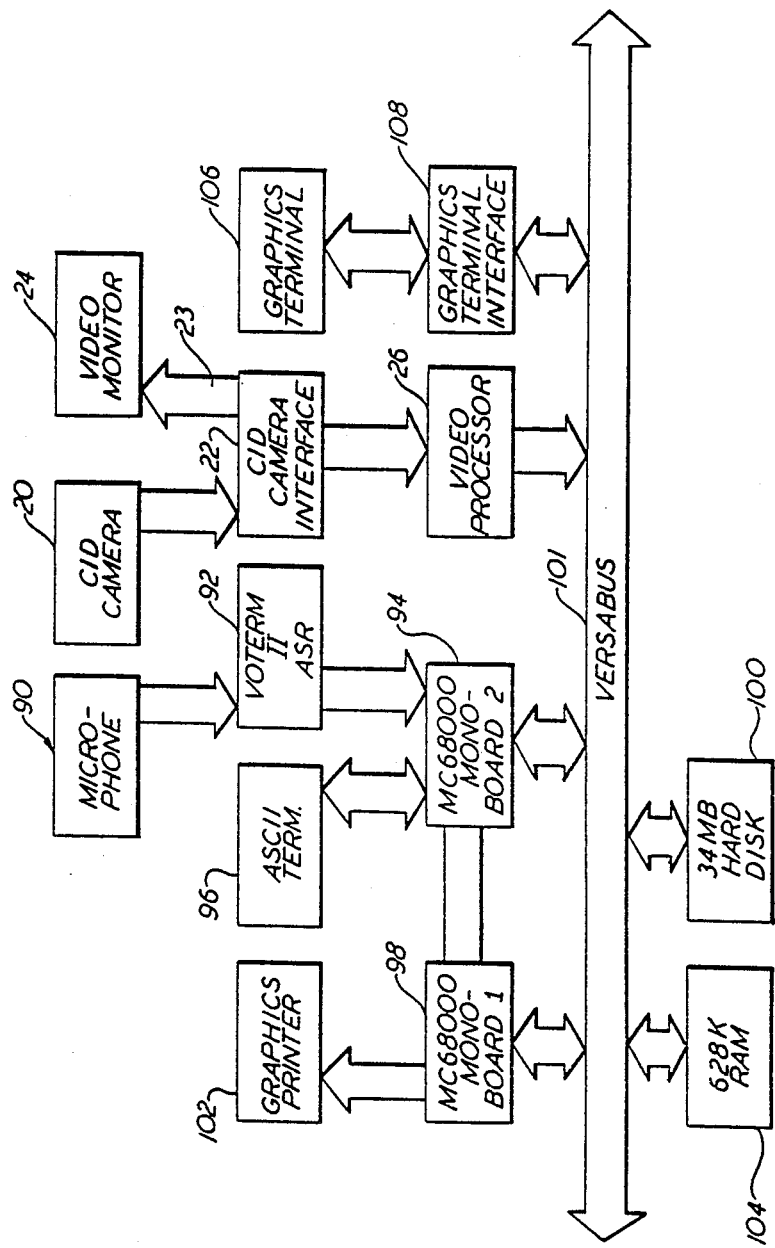
FIG. 4 is a system block diagram of the tracking and detection system incorporated into a speech recognizer.

FIG. 4 is an overall block diagram of the system showing a means for producing the image of FIG. 3. CID (Charge Injection Device) camera 20 is a solid state camera.

A solid state video camera, as opposed to a conventional vidicon camera, is preferable for obtaining the individual video frames of a moving object for a number of reasons. The most important reason is that solid state cameras have virtually no lag from one frame to the next, whereas lag can be a great problem with a vidicon camera. Secondly, solid state cameras are capable of a higher frame rate than conventional vidicon cameras.

Two more reasons for preferably using a solid state camera for lipreading are the high sensitivity and small size of the camera. The image sensor array has a better dynamic range than the vidicon camera so that dark regions such as the interior of the mouth can be detected more easily. Since the image sensor array of the camera is less than four square centimeters in area, it could conceivably be head mounted beside a microphone and light sources on a boom. Head mounting is not, however, necessary for implementing this invention.

The CID camera 20 forms an image of an illuminated individual face and outputs timing information and a voltage proportional to the light intensity of each picture element or pixel. The resolution of the camera may be 244×248 pixels with a frame rate or field rate of 60 Hz. Such cameras are readily available from common commercial sources, and a General Electric TN2500 camera may, for example, be used for this purpose.

The facial image produced by CID camera 20 is highly dependent on the position of the light sources and, in particular, changes in lighting which cause variation in texture, color and shading, and especially the contours of the face. The nostrils and mouth are among the most variable areas.

Two opposing considerations determine the optimum lighting position: the nostrils and mouth are best discriminated with side lighting, and the inside of the mouth is best illuminated with frontal lighting to obtain tongue information. It is best to maintain uniform, symmetrical light sources placed at about plus and minus 45 degrees from the center position directly in front of the face, as shown by light sources B and C in FIG. 7, where the camera 20 is shown at A and the individual is shown at G. Side covers E and F and an overhead cover D may be provided to enhance lighting and thus detection, although such covers are not necessary and for practical reasons should be avoided.

Camera interface 22 is also a common, commercially available component provided with the camera. Camera interface 22 powers the CID camera 20 and digitizes the video signal data from the camera into 8 bit bytes designating the intensity of each pixel. Other signals provide timing information. The output rate preferably is about 4.5 megabytes per second. Timing information includes horizontal and vertical synchronization ("SYNC") and 4.5 megahertz and 22 megahertz clock signals, as well known.

As shown in FIG. 4, speech signals from a microphone 90 are provided to an acoustic speech recognition circuit (ASR), which may be a Voterm II manufactured by Interstate Electronics Corporation. The acoustic recognizer limits the duration of an utterance to 1.25 seconds. Therefore, approximately up to 5.625 megabytes of video data are available per word, which are too many bytes for the microprocessor system, which preferably comprises a dual board MC68000 based minicomputer system, to handle in real time without special purpose hardware.

The nature of facial contours permits the use of gray scale thresholding to discriminate facial features such as the lips and nostrils. Gray scale thresholding produces contours of equal gray level or isophotes which can be efficiently calculated and encoded to reduce the video data. Thresholding and contour coding algorithms are implemented in hardware which operates at the video frame rate of 60 Hz and achieves an overall data reduction of approximately 64 to 1. Image windowing hardware achieves another factor of four data reduction, resulting in a combined data reduction of 256 to 1. The software in the microcomputer is able to quickly process the roughly 100,000 bytes of video data per word and computer mouth parameters for each frame (8 bytes per frame) which are stored for the entire word as lip parameter time sequences. Thus, the total reduction from raw image to mouth parameters is about 7500 to 1.

The composite video signal 23 may be transmitted to a video monitor 24 which displays the unprocessed image on a video screen. The monitor may be used to adjust manually the camera focus and aperture opening, but these functions also may be performed automatically by suitable, feedback control circuits. Video monitors are commonly available commercial components.

Figure 5:
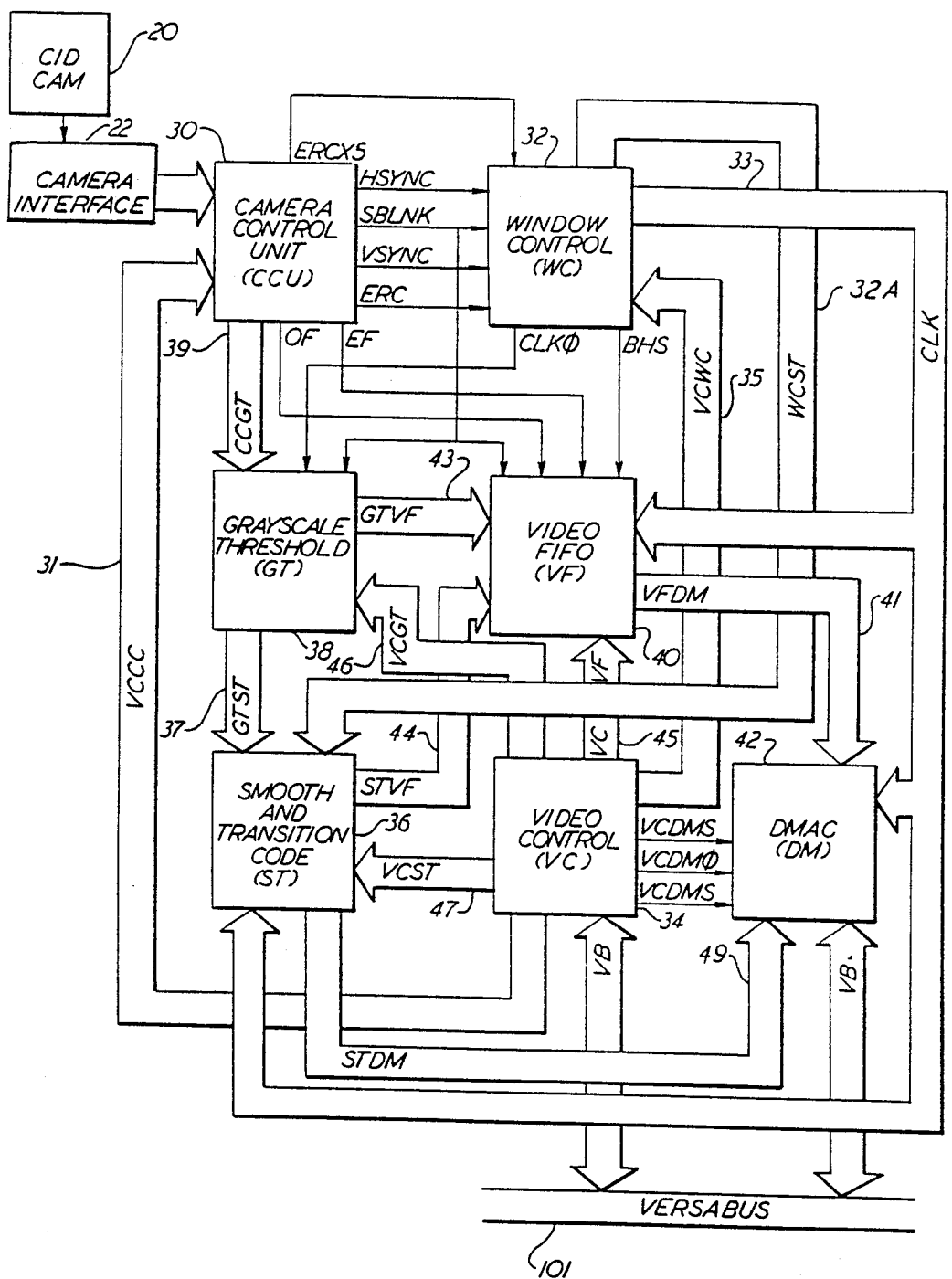
FIG. 5 is a block diagram highlighting the camera interface and the video processer of FIG. 4.

The digital output from camera interface 22 is transmitted to video processor 26. Video processor 26 and camera interface 22 are shown in more detail in FIG. 5. In FIG. 5, an asterisk (*) means the negative of true logic. Video data from camera 20 reaches camera control unit 30 via interface 22. Camera control unit 30 is in essence a pin connector between video processor 26 and camera interface 22. ERC* is the 4.5 MHz element rate clock (ERC) which is used to clock and capture the digitized video data. This is a standard signal defined with respect to the camera used. ERCX5 is a signal five times the element rate clock (about 22 MHZ) which is used to control the capturing of digitized video data. HSYNC is the horizontal synchronization signal and VSYNC is the vertical synchronization signal which are used for line and frame control purposes. SBLNK* synchronizes the signal blanking and is approximately the logical OR of the horizontal and vertical synchronization signals. The camera preferably is configured for a 60 hz non-interlaced mode. Data bus 31 (VCCC) is provided for the transmission of control signals for the control unit 30 from a video control unit 34. The ERCX5, HSYNC, VSYNC, SBLNK* and ERC* signals are transmitted to a window control unit 32. Window control unit 32 uses these control signals to construct the data windows around facial features shown in FIG. 3 to exclude irrelevant video information.

Generally, the task of locating the mouth region in an image of the entire face is accomplished by locating and then tracking the nostrils as the person moves with respect to the camera. The nostrils may be initially located using region matching against sample nostril templates of the particular individual composed of region parameter values. These sample nostril templates can be determined manually (by measurement) and loaded into the system or automatically by pattern recognition programs, for example, via feedback from a graphics terminal. To conserve region matching time, a nostril window 12 (FIG. 3) is set for the next frame by software. The nostril searching then occurs only within the nostril window which is updated for each frame as the individual's head moves. The mouth region is nearly fixed and the upper teeth are completely fixed in a, position relative to the nostrils, thereby allowing the nostrils to be used as a convenient reference coordinate system for tracking the mouth region. Thus, a mouth window 13, as shown in FIG. 3, may be set. Within mouth window 13, all dark (i.e., lowest graylevel) regions are assumed to be mouth regions.

Clock signals on clock bus 33 and HSYNC signals are used to switch on and off the video signal depending on whether the signal is within the defined windows. Window control unit 32 contains two 8 bit counters which correspond to the vertical and horizontal components of the video data. The horizontal counter is driven by the ERC* signal and the vertical counter is driven by the HSYNC signal. The output of the counters are compared with the vertical and horizontal window coordinates which are predefined and held in registers in video control unit 34. The window coordinates are fed to window control unit 32 via bus 35 (VCWC). The contents of the registers are controlled by a subsequently described computer program. Window control unit 32 comprises two magnitude comparators which are used to determine that the vertical and horizontal coordinates of the video image correspond to the range allowed by the computer program. When values are within the acceptable range, the ERC* signal for horizontal and HSYNC for vertical components of the window are switched on. The BHS* signal corresponds to the result of the HSYNC signal gated by the vertical window circuit and the CLK signals on clock bus 33 are the ERC* signal gated with the horizontal window circuit and derived from phase divisions in the ERC* signal. Bus 32A (WCST) is a data bus for carrying data defining the horizontal coordinate of a pixel at a given time and is used for transition coding in smoothing and transition coding circuit 36.

Preferably, four mouth region parameters are stored for each video frame in a word and four sample templates are stored for each word. A weighting factor is associated with each parameter and the relative value of each parameter is thus reflected in the weighting factor assigned to it during word matching. The mouth region parameters in decreasing order of value are the mouth region height, area, width, and perimeter length.

The mouth region height has been found to be the best determinant of mouth closure, which has a great effect on acoustic speech. Further, the mouth region height is always close in value to the vertical lip separation, even when the teeth or tongue are breaking the region between the lips. The mouth region area and perimeter length both contain information about tongue presence, since the tongue breaks the dark mouth region which decreases the are and increases the total perimeter length. The teeth also have this effect. Finally, the mouth region width gives information about lip rounding which is important for vowel sounds.

The video images of the nostrils and mouth in windows 12 and 13 are encoded into shades of gray, known as gray scaling, as indicated above. The encoding is based on whether the pixel intensity is above a specified threshold, which is known as gray scale thresholding. The gray scale thresholds may be manually set via gray scale threshold circuit 38 which contains 3 magnitude comparators for receiving threshold data from video control unit 34 via bus 46 (VCGT). Eight bits of video data on data bus 39 (CCGT) are connected to the three comparators which output to a priority encoder chip, a commonly available component. This chip has four priority encoded inputs which determine the status of two output bits, based on which of four conditions is true. In a preferred embodiment, three input bits are used and, based on the observed value of the gray scale, the output bits represent values of 0, 1, 2, or 3 in binary code. This serves to transform the eight bit gray level code into a two bit gray level code having four values. The two bit gray level code values are transmitted to smoothing circuit 36 via bus 37 (GTST) and then packed four to a byte by a shift register in circuit 36 and optionally transmitted to video memory FIFO 40 and to transition coding circuitry, which is also part of block 36.

DMA controller 42 (Direct Memory Access) has four input channels, dedicated, respectively, to Video Memory FIFO 40, the raster smoothing circuit and the transition coding circuit. Another channel is unused. DMA controller 42 allows data to be stored in RAM 104 (FIG. 4) at different levels of processing. Video memory FIFO 40 is used for buffering so as to regulate use of the main system bus, VERSABUS 101, since processed data from the camera arrives at a faster rate than the bus 101 can handle. Optionally, processed video data from circuit 36 may be sent directly to the DMA controller 42 via bus 49 (STDM). Routing to video FIFO 40 is controlled by video control unit 34. Data bus 46 (VCGT) is provided for threshold and control information from the registers in video control unit 34. Data path 37 (GTST) comprises a data path for thresholded video data which consists of the two bit graylevel code described earlier. Raw 8 bit video data on data bus 39 (CCGT) can pass through gray scale threshold circuit 38 unaltered and out data bus 43 (GTVF) to the video memory FIFO 40, if it is desired to achieve a more detailed image analysis.

Video memory FIFO 40 is a standard, commercially available two port memory, preferably with 256×9 bits. The 9th bit is a control bit which, when on, gives special meaning to the other 8 bits. The special meaning corresponds to the beginning of a window frame or raster. One bit corresponds to the HSYNC signal and one bit corresponds to the VSYNC signal. Bus 41 (VFDM) outputs to one channel of DMA controller 42 and then into memory 104 (FIG. 4) via the VERSABUS (VB) 101. The CLK and SBLNK* signals are used to time the video FIFO 40 operations. Inputs to video FIFO 40 include signals OF* and EF* which can be subjected to a logical OR operation to produce the VSYNC signal. Bus 44 (STVF) is the data path for smoothed and transition coded video data. Bus 45 (VCVF) is the data path for control signals which clear video memory FIFO 40 for the next frame of video. Bus 41 (VFDM) is the data path for the 8 bits of video information and timing information, the latter serving as a "hand shaking signal" between video memory FIFO 40 and DMA controller 42. The handshaking signal switches the "ready to accept" and "accepted" status modes for the data movement along bus 41. The video memory FIFO 40 is a slave to the DMA controller 42, when data is read from memory 40, and the DMA controller 42 then is controlled by signals o the VERSABUS 101 from the system computer. Alternatively, DMA Controller 42 may operate in a bus master mode.

Video control unit 34 contains registers and serves as a bus interface. The VCST data bus 47 is used to load address and data for look up tables in the smoothing and transition coding circuit 36. Bus 31 (VCCC) controls the various camera 20 modes which are described in the camera manual published by the camera manufacturer. The interface between video control unit 34 and bus 101 is a slave interface.

DMA controller 42 contains a standard, commercially available DMA controller chip which serves as a gating mechanism for controlling the entry of data onto bus 101. The CLK bus 33 signals when processed data is available from the STDM data bus 49, rather than from the video memory FIFO 40. Data from the smoothing and transition coding circuit 36 thereby bypasses the video memory FIFO 40 and is assigned to separate DMA controller 42 channels via bus 49. VCDM0* enables the DMA controller chip and VCDM5 and VCDM6 control how the video memory FIFO 40 data are arranged in the computer memory 104.

Figures 6, 6A:
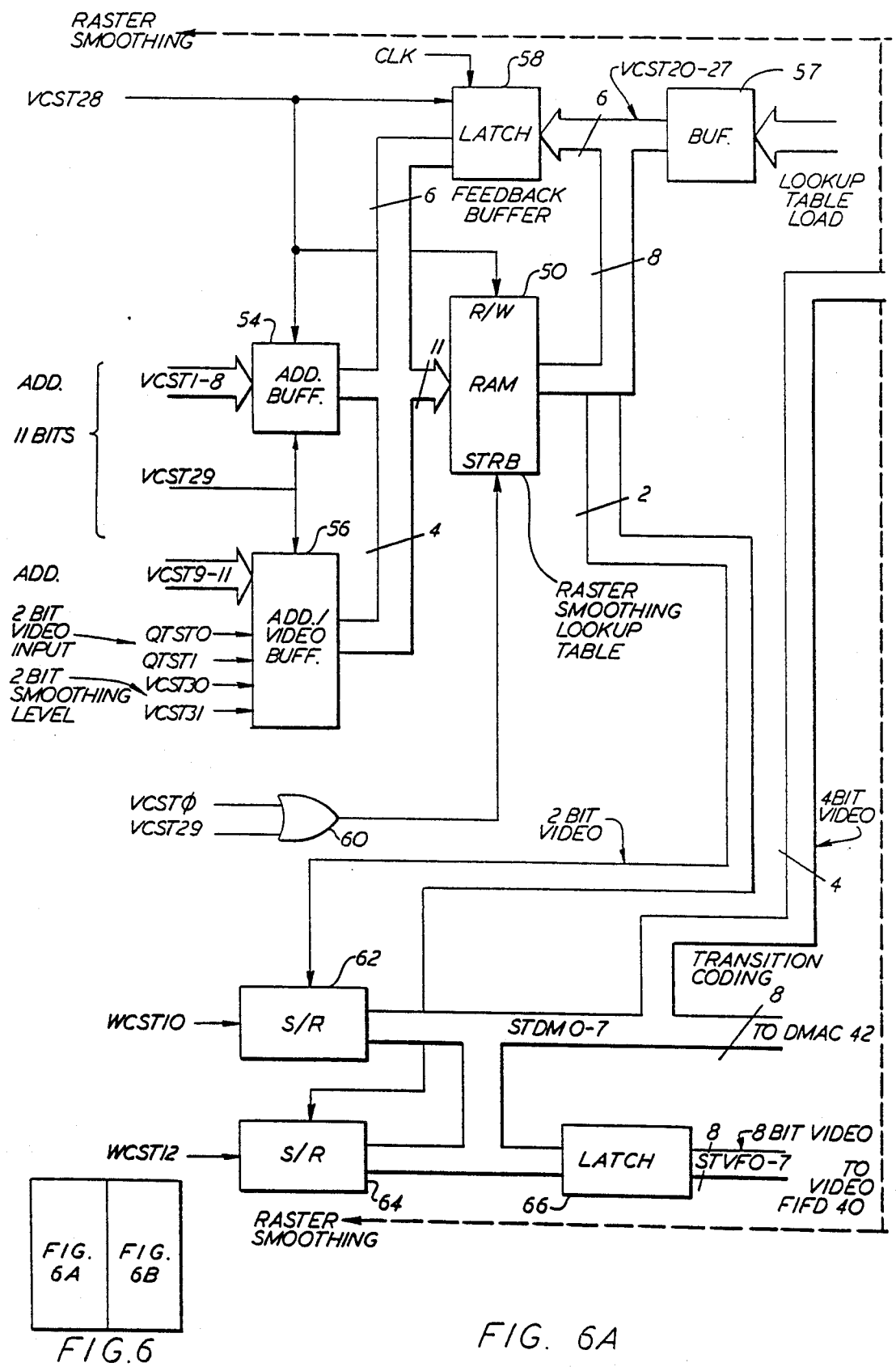
FIG. 6 illustrates the orientation of FIGS. 6A and 6B.
FIGS. 6A and 6B together form a detailed block diagram of the smoothing and transition coding circuitry of FIG. 5.
Figure 6B:
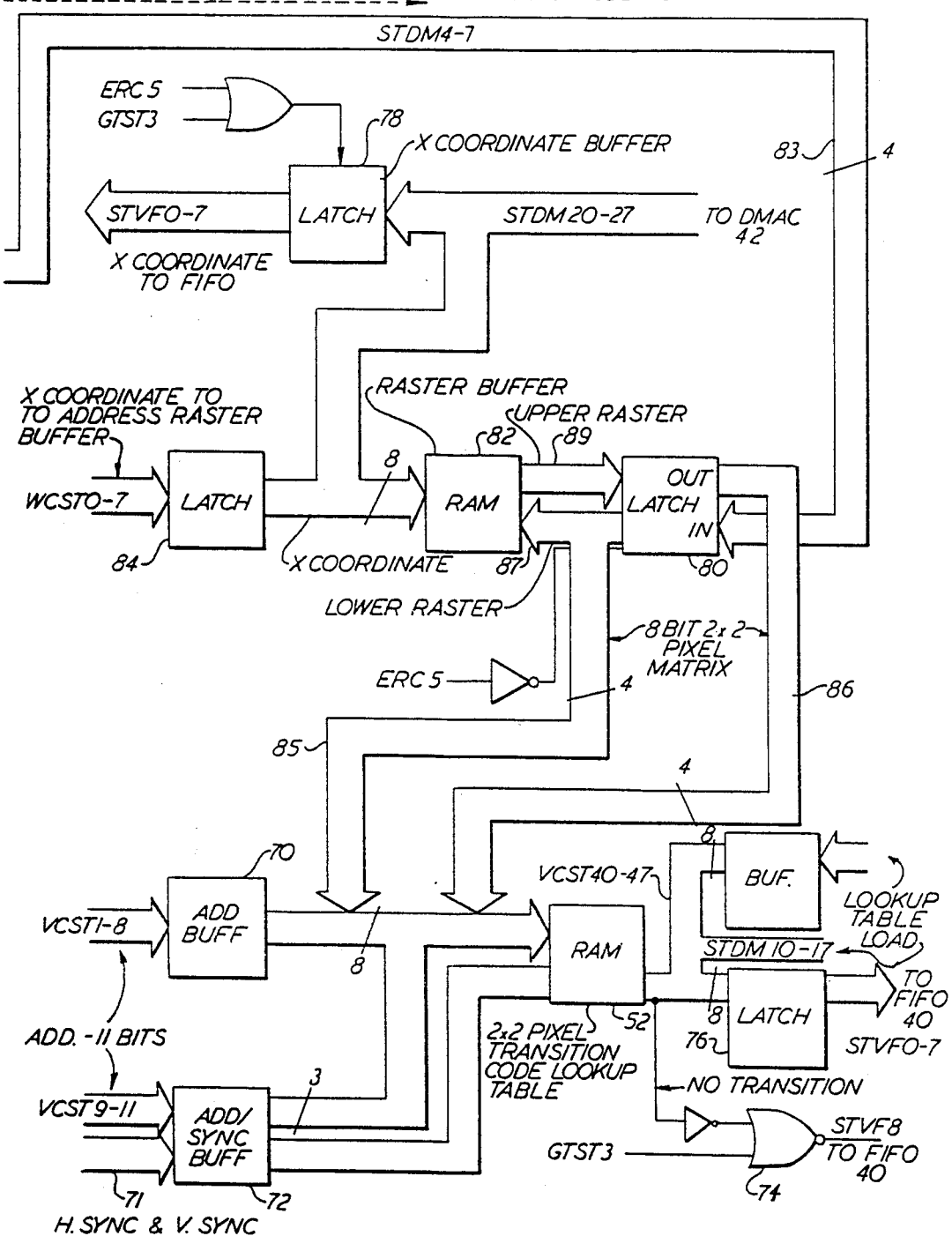

FIG. 6 is a more detailed block diagram of the smoothing and transition coding circuit 36 shown in FIG. 5. Generally, if the widths of the objects of interest (e.g. nostrils, mouth) are always above a certain number of pixels, then the gray scale thresholded image can be simplified further by changing the gray level of a pixel sequence of less than a specified length to the gray level of its neighboring pixels. As indicated, this is known as raster smoothing. Raster smoothing preferably is provided because the camera sensitivity varies from column to column of the camera sensor cell array such that thresholding results in many vertical lines, one pixel in width, as shown in the image of FIG. 1, and it is necessary to eliminate such noise (called artifact signals) to reduce computer processing time.

The raster smoothing process preferably starts from the left end (i.e., beginning) of the raster and proceeds to the right instead of averaging over the whole raster. The starting or default gray level is initialized to that of the leftmost pixel and is updated to the gray level of the last pixel run (row of adjacent pixels) with a length greater than the specified minimum. Raster smoothing is complementary to contour coding, which is subsequently discussed in more detail, because horizontal transitions in gray level cause a large increase in contour code.

After raster smoothing, additional data reduction is necessary. The choice of further data reduction techniques is limited by the need for real-time analysis of the video data. Run length coding is efficient and relatively easy to implement in hardware but the resulting code does not lend itself well to real-time analysis. Alternately, typical contour tracing schemes yield more easily analyzed code but require that an entire frame be buffered in memory so that a computer program can code the frame, which is too time consuming, and the algorithms are not easily implemented in hardware.

A compromise between run length coding and contour tracing is a technique called predictive differential quantizing, ("PDQ") which is discussed in greater detail in T.S. Huang, "Coding of Two Tone Images," *IEEE Transactions of Communications*, Vol. Com-25, No. 11, November 1977. This technique only requires the storage of two raster lines at a time and is simple enough to be implemented in hardware. The resulting code is similar to that produced by contour tracing but can be easily coded with variable length words. PDQ involves the processes of encoding transitions of matrices of pixels, followed by contour coding and region coding.

Refer now to the block diagram of the video processor in FIG. 5 for the following discussion of the operation of PDQ which preferably is implemented in hardware. Scanning from top to bottom, pairs of thresholded and smoothed raster lines are buffered in smoothing and transition coding circuit 36, where the PDQ hardware resides. Scanning from left to right of the raster pair, a graylevel transition in either raster is detected and classified as to transition type using a hardware lookup table. There are ten possible transition types for a multiple gray level image, as shown in FIG. 8. In FIG. 8 an "x" indicates a horizontal gray level transition and the short parallel vertical lines indicate gray level equality between the raster sections immediately above and below the lines. Inequality is indicated by a slash drawn through the vertical lines. With a binary image, only six possible transition types (1, 4, 5, 6, 8, and 9) are possible. The transition type, graylevel and horizontal video coordinate of the lower left pixel are transmitted to video memory FIFO 40 via bus 44. The DMA controller 42 transfers the data at a high speed of 4 megabytes per second via VERSABUS 101 to memory 104 where it is processed by a computer program. See FIG. 4.

Referring now to FIG. 6, which shows the raster smoothing and transition coding circuitry in greater detail, memories 50 and 52 are standard, commercially available memory units. Memory 50 is provided as a lookup table for the raster smoothing process and memory 52 is provided as a lookup table for the transition coding process. The VCST data path contains address information and data. VCST20-27 comprises data from the VERSABUS 101 and VCST1-8 and VCST9-11 comprises address information for loading the lookup table RAM 50. Buffer 54 and one half of buffer 56 are provided for address information. The other half of buffer 56 is provided for the 2 bit graylevel video information. Tristate buffers 54 and 56 have high, low and off states. They are linked together so that address and video information cannot both output to the address port of RAM 50 at the same time. Thus, there are two data paths to the memory 50 address port. A latch 58 further is provided, which, due to the described tristate control and clock, is never on at the same time as buffer 54, but is controlled on when video information addresses RAM 50, i.e., when the video buffer half of buffer 56 is on. VCST28-29 control the "on" and "off" status for the latch and buffers and the read/write control of memory 50. When activated, the address buffers 54 and one half of 56 are "on" and the memory is in the write mode and lookup table data is written into memory 50 via buffer 57; when deactivated, the latch 58 and other half of buffer 56 is "on" and the memory is in the read mode. OR Gate 60 sends a pulse which strobes data into memory 50. Once memory 50 is loaded with data, latch 58 is turned "on" and the address buffers are turned "off," and memory 50 is placed in the read mode and smoothed video information is available at the data outputs of RAM 50. The addresses for the information in memory 50 are determined by the 2 bit gray level video (GTST0-1) from latch 56 and the specified 2-bit smoothing level (VCST30-31), the latter defining pixel run length of from 1 to 3. Thus, VCST30-31 control the minimum number of pixels per pixel run. For example, raster smoothing may be performed with pixel runs of 2 or 3, and a pixel run of 1 indicates no smoothing.

Lookup table address video information from threshold circuit 38 in FIG. 5 is received on GTST0-1. When the video half of latch 56 is "on", the 2 least significant bits of address are routed to the lookup table in memory. These bits are recycled through latch 58 and memory 50 so as to shift the bits by two bits. A clock controls latch 58 so that a four pixel window moves along a row of pixels at the rate of one pixel per clock period. Memory 50 is loaded with smoothed values for all possible values of four pixels in a row in a raster. A computer program may be used to specify a minimum number of pixels of equal gray level in a row, thereby defining the pixel run (VCST30-31). This serves to smooth the image data into clear transitions in the shades of gray.

An assembly language program residing in computer board 94 (FIG. 4) controls the loading of the raster smoothing and transition coding lookup tables. The raster smoothing program involves setting initialized values for four pixels and setting the minimum number of pixels in a row which must change in gray value before being recognized as a transition. The program loads RAM 50 with the smoothed value at each address to act as the lookup table. The assembly language program also constructs a transition coding lookup table in RAM 52, to be described below. This table contains the pairings of pixels in two by two matrices which are the acceptable raster pair transition types. See FIG. 8.

Shift registers 62 and 64 are 4 bit registers which combine single pixel data into a 4 pixel bytes. The registers also output to the DMA controller 42 or the video memory FIFO 40 through latch 66 if only thresholded and smoothed data, without further processing, is merely desired. Two pixels (4 bits) are otherwise sent to transition coding circuitry through latch 80 via bus 83.

Whereas the formerly described portion of the circuitry in FIG. 6 was dedicated to smoothing data, the remainder of the circuitry is dedicated to transition coding. Memory 52 receives input from two buffers 70 and 72. Buffers 70 and 72 operate similarly to buffers 54 and 56, i.e. buffer 70 is provided for address information during a lookup table load operation and buffer 72 is provided for two types of information, address information and synchronizing signals. Address buffer 70 takes the lower eight bits of address data (VCST1-8) and half of buffer 72 takes the upper three bits (VCST9-11). The remaining half of buffer 72 is used to transmit synchronizing signals 71 relating to horizontal and vertical synchronization into memory 52. Lines VCST40-47 transmit data from the VERSABUS 101 via buffer 79. Memory 52 is loaded with a look-up table with the addresses equal to the four square pixel matrices which each reference one of the ten possible transition types of gray scale (FIG. 8). This occupies four bits of the memory 52 output byte, with two additional bits being the gray level of the lower left pixel. One bit is used to designate no transition and disables gate 74 to the video memory FIFO 40 to prevent writing data to FIFO memory 40 in the event no transition is detected. Latch 76 performs the function of buffering transition coded data to the FIFO 40.

Buffered latch 78 serves to buffer horizontal coordinate data to FIFO 40. Data coming in on the WCST0-7 data lines gives the horizontal coordinate. Latch 84 and latch 78 serve as the path to the FIFO memory 40 for the horizontal coordinate. STDM20-27 are data lines going directly to the DMA controller 42.

Smoothed data for two pixels is transmitted to tristate buffer 80 via bus 83 and latched with ERCX5, a delayed ERC signal. Raster buffer 82 preferably is a dual port 256×4 bit RAM. Because pairs of raster lines are compared to determine the transition type, one line of the pair must be stored in memory. Buffer 82 serves this purpose. As a pixel pair (lower raster) is fed into latch 80, the data previously in RAM 82 is forwarded to latch 80 via bus 89 (upper raster), and the new data in latch 80 replaces a previous pair of pixel data in RAM 82 via bus 87. The horizontal coordinate is latched by horizontal counter buffer 84, the horizontal coordinate being the address for raster buffer 82. Two pixels (upper raster) from buffer 82 via latch 80 and two pixels (lower raster) from latch 80 address the transition coding lookup table RAM 52 via respective buses 86 and 85. When there is no gray transition, the ability to write to FIFO memory 40 is disabled via line STVF8.

Thus, to store the previous raster line while bringing in the second line of data and to create a 2×2 pixel matrix, buffer 82 is employed The lower pixels in a matrix are input as new pixels on bus 87 of memory 82 via latch 80. The two upper pixels for the matrix are read from buffer 82 via bus 89 into latch 80. A 2×2 matrix which addresses memory 52 via buses 85 and 86 is thus formed. Memory 52 uses the look-up table stored therein to recognize the gray level transition type and the gray level of the lower left pixel from the addressing 2×2 matrix. The result is a transition coding which identifies the transition type of the 2×2 pixel matrix (FIG. 8), which coding is fed via latch 76, video memory FIFO 40 and DMA controller 42 onto VERSABUS 101.

As discussed, in the preferred embodiment, visual speech recognition is combined with acoustic speech recognition. Returning to FIG. 4, therefore, the preferred embodiment also contains microphone 90 which may be a Shure Brothers SM10 or comparable microphone. Microphone 90 is connected to an acoustic speech recognizer 92 (ASR) such as a commercially available Voterm II which amplifies and amplitude normalizes an acoustic signal. In the embodiment illustrated, the spectral energy in 16 frequency bands ranging from 200 to 7000 Hertz is obtained using an analog bandpass filter bank. The spectral data is digitized and read into the memory of a dedicated microcomputer system (in the Voterm II) for matching against trained speech templates. Microphone 90 is first used to initialize the acoustic recognizer 92 memory to the individual speaker. The Voterm II 92 has a template memory which is loaded with a hundred words and stored on hard disk 100 via microprocessor 94, which may comprise an MC68000 single board computer or monoboard. Nonlinear time warping may be performed during the matching process using dynamic programming to compensate for differences in utterance length and local variation in speaking rate. The user may set several parameters in the Voterm II 92, the most important being the reject threshold, which is described below.

The acoustic recognizer 92 outputs the two most likely recognition candidates along with their scores. A score threshold may be set in the acoustic recognizer 92 which rejects candidates with scores below the threshold, indicating inadequate match with any acoustic template. In general, a compromise must be made between score threshold extremes. A restrictive (high) threshold forces the speaker to repeat the utterance more frequently to obtain a recognition. This is time consuming and intrusive. At the other extreme, a low threshold causes the recognizer to respond to noise (breathing, room noise, etc.) and poorly spoken words. For the purpose of lipreading tests, the threshold may be set to zero so that all utterances are recognized, which, however, increases the error rate of the acoustic recognizer. The acoustic recognizer 92 also outputs a binary signal indicating the occurrence of an utterance. This is used as a boundary detect signal to determine when to sample the video data.

Finally, the recognition results (winner and runner-up) are passed to the automatic lipreading system for comparison with the lipreading results. The output from the acoustic recognizer 92 is sent to monoboard II 94. Computer terminal 96 is an ASCII terminal, such as a Heathkit H19 terminal, and is used for main system control. Terminal 96 is plugged into the serial port 1 of monoboard 94. Serial port 2 of monoboard 94 is connected to serial port 1 of monoboard 98, another Motorola MC 68000 computer board. A graphics printer 102 may be plugged into serial port 2 of monoboard 98. Monoboard 94 has a parallel interface to the acoustic recognizer 92. Monoboard 98 may also host the operating system, which may comprise VERSADOS, software available from Motorola. Monoboard 94 is host for the previously described assembly language program, which requires no separate operating system. Monoboard 94 controls the acoustic recognizer 92 and its computer program regulates functions such as a screen editor and syntax controller. Additionally, a video processor controller program on board 94 regulates display capabilities of a graphics terminal 106, except for contour coding data. Monoboard 98 processes and controls display of the contour coded data. Video processor 26, as indicated, outputs transition coded data which is subsequently further processed by monoboard 98.

An additional feature of the described system is syntax control which divides a memorized vocabulary into groups. All words in an activated group are recognition candidates and when one word is recognized, the next group that the word points to is loaded into the acoustic recognizer 92 and activated. The video processor controller function on monoboard 94 may be used to display thresholded video data and to control manually and smooth the video image in the set windows. In the latter mode, monoboard 98 is inactive. Monoboard 94 shares the VERSABUS 101 with video processor 26. Monoboard 94 reads and transforms video data as described above and writes the data to the graphics terminal 106 via graphics terminal interface 108. Graphics terminal interface 108 is a slave to the VERSABUS 101.

Monoboard 94 hosts the previously described assembly language computer program. Monoboard 98 tells monoboard 94 the beginning and end address in memory 104, acoustic template data locations from the acoustic recognizer 92, and the limits of buffers for video storage. Monoboard 98 waits for a word boundary detect signal from the acoustic recognizer 92 via monoboard 94.

Upon receipt of the start of a word boundary detect signal from acoustic recognizer 92, monoboard 94 reads the memory address register from channel zero of the DMA controller 42, which is part of video processor 26, and waits for the end of the word. The stop signal for the DMA controller 42 comes from the acoustic recognizer 92 via monoboard 94 at which time the memory address register of the DMA controller 42 is read. The acoustic recognizer winner and runner-up recognition candidates and their respective scores are written to memory 104 for monoboard communication. Monoboard 98 is then enabled by monoboard 94 and the first frame of the video data is analyzed. As explained, analysis consists of first finding the nostrils and setting a nostril window. Secondly, the mouth window is set and the four described mouth parameters are calculated. Subsequent frames then are analyzed within the set windows. Mouth parameters are stored in an array in memory 104 and templates are read from the hard disk 100 with four templates per word. Matching is based on a formula, which is subsequently discussed, and each template is matched to find a word in the vocabulary of the memory. A single value score for each word is computed and a ranked score is computed with the least value being the best based on a distance between the unknown utterance and the templates.

Thus, after all the words in the system vocabulary have been acoustically and visually trained, speech recognition is accomplished first by respective pattern matching. Acoustic candidates are combined with lip reading candidates and matched so as to pick the lowest rank, i.e. most likely word spoken.

The software stage of PDQ is divided into two distinct levels. In the first level, horizontally adjacent transition types from the transition coder 36 are used to encode edges. An edge is defined to be a section of a contour with continuous graylevels on either side of it and no ridges or saddle points in between its endpoints. Thus only three actions are required to code edges: start an edge, continue an edge, and end an edge.

When an edge is started, the starting coordinate and the graylevel of the pixels to the left and including the edge are encoded. A pointer to the edge data in memory is created for future reference. When an edge is continued, the horizontal deviation of the edge from the first raster line to the second is stored in the edge data area. Finally, when an edge is ended, the endpoint coordinates are stored in the edge data area and the edge is complete. In the process of coding the edge, the area between the edge and the next edge to the left, the length of the edge, and the coordinates of the maximum horizontal excursions to the left and right are also computed and stored. These edge parameters are used later to compute region parameters.

In a second level of the coding, edges are connected together to complete contours. This requires the use of two slightly different edge connection algorithms. The first connection algorithm simply sets pointers between edge endpoints (start and end points) which are adjacent to each other. Endpoints are adjacent horizontally if separated by a pixel run of constant graylevel, and vertically, if the graylevel is continuous on at least one side of the transition. The second connection algorithm recognizes edge endpoints that can not be immediately connected to one of their horizontal neighbors and stores the disconnected endpoint for later connection. The latter situation occurs whenever there are at least two graylevel transitions in a row on the same raster line with no transitions on the other raster line in the raster pair.

A region is defined as the set of pixels of constant graylevel within a closed contour. The purpose of parameterizing the regions in an image is to reduce the computing required to classify or label the regions (e.g., nostrils, teeth, lips, tongue). The process of choosing meaningful region parameters (e.g., length, height, area, perimeter, etc.) requires the use of scene semantics. In the case of lipreading, the initial choice of region parameters is aided by lipreading science but the non-quantitative nature of the subject requires that the set of optimum region parameters be experimentally determined. Thus, the best course of action is to try the most easily computed parameters first and then search for better and probably more complex parameters until one reaches a compromise between computing cost and region labeling accuracy.

Since the region coding and all subsequent processing are implemented in software and not in the above described hardware, there is flexibility to add region parameters with little effort. The simplest region parameters to compute from the contour code are the graylevel, area, perimeter length, leftmost, rightmost, topmost and bottommost coordinates, and the number of edges in the contour surrounding the region.

The perimeter length of the region is simply computed by summing the length of the edges in the contour. The number of edges in the contour can be computed easily as a byproduct of the other computations. The extreme points of the region are computed by searching all edges in the contour for the greatest and least values of endpoints and horizontal extreme points. Finally, the graylevel of the region is simply the graylevel to the left of any edge which is traced downward.

Additional parameters may be computed which are either functions of existing parameters (e.g., height and width), functions of the edge parameters or functions of the edge points. Once individual regions have been classified, more complex parameterizations can be used on specific regions only. This form of computer attention focusing can greatly reduce processing time.

The classification of regions requires computing the distance in parameter space between the region in question and a template region. Regions within a certain distance of the template region are in the given class. Equivalently, one can define a hypersurface in the parameter space. Regions with parameter vectors that are contained by the surface are in the class defined by the surface. The former approach is preferred for its simplicity which depends, in part, on the distance measure used. The region distance measure is large for close distances and small for far distances. Its general form is:

$$D_{tot} = \sum_{i=1}^{n} (D_i W_i)$$

where $D_i$ and $W_i$ are the parameter distance and weight for parameter i, respectively, n is the number of parameters, and $D_{tot}$ is the region distance. The parameter weights are adjusted experimentally to achieve the most accurate region classification.

Two types of parameter distance measures are used. For extreme points (leftmost point, etc.) the absolute value of the difference (L1) is used with a small scaling factor. For every other parameter the following is used: $D_i = 100 (1 - (P_i/Q_i))$ where $P_i$ and $Q_i$ are two values of parameter i, and $Q_i \geq P_i$. These distance measures were chosen for computational simplicity; only integer arithmetic (as opposed to floating point) therefore is required.

The word boundary detect signal of the acoustic speech recognizer 92 is used to mark the beginning and end of the video data which is continually stored in memory in a circular buffer. Continual storage of the video data allows the capturing of several frames preceding the acoustic word beginning which contains valuable speech information. Nostril tracking and extraction of the mouth region parameters are then done frame by frame after the utterance.

As with region parameter matching, each mouth parameter must be assigned a statistical weight so that the distances between the unknown word and all of the template words can be calculated. The only conceptual difference between region matching and word matching is that word parameters are time sequences. This does not really complicate the word distance measuring process much since the distance between the time dependent parameters is still a single value.

Calculating the distance between two parameter time sequences of differing length may be aided by time warping to equalize the lengths, especially if they are long sequences. Linear time warping, which is the easiest method, does not work well for matching acoustic spectra. This is due in part to the tendency of humans to quickly vary their speaking rate so that phoneme boundaries are quite variable in position. Dynamic programming is used instead for acoustic time warping. This technique minimizes the distance between the parameter time sequences as the distance between the parameter time sequences is computed. Since the transitions in visual speech are slower than in acoustic speech, linear time warping of the visual speech parameter sequences should be adequate. Alternatively, if linear time warping cannot be used, then dynamic programming may be provided. This may, however, be difficult due to the complex structure of the visual template.

To account for differences in word lengths between the utterance and the stored templates, differences in word length may be penalized by padding the end of the shorter of the two parameter sequences with zeroes until the unknown sequence is equal to the template sequence in length.

The L1 distances between extreme points for corresponding mouth parameters are summed and each parameter distance is multiplied by a weight before all being added together for each frame. The final score is the sum of all the frame scores. The word match score is directly proportional to the distance, i.e., a low score gives a close match.

$$S_{ij} = \sum_{f=1}^{\max(n_i, n_j)} (|A_{if} - A_{jf}| W_A + |B_{if} - B_{jf}| W_B + |C_{if} - C_{jf}| W_C + |D_{if} - D_{jf}| W_D)$$

where $A_{if} = B_{if} = C_{if} = D_{if} = 0$ if $f > n_i$. In the above equation, $S_{ij}$ is the total distance between two words, $A_{if}, B_{if}$... are the parameter values for word i frame f, and $n_i$ is the number of frames in word i.

An automatic weight optimization method may be used on the four mouth parameter weights. Linear independence between parameters is assumed so that the weights can be optimized independently of each other. This assumption enables the scanning of a range of weight values for one parameter at a time to optimize that weight without concern for the other weight values. In actuality, the parameters are probably not linearly independent of each other, but without this assumption, the search for the optimum set of parameter weights is very difficult. Thus, the assumption allows finding locally, if not globally, optimum weight values.

For each step in the weight scan, the distances between all pairs of the templates are computed. An error is logged if a sample of a given word is not closest to at least one other sample of that word. The weight value which yields the least number of cross-template matching errors is optimum. The next parameter weight is optimized with the previous weight set to the optimum value. The order in which the parameters are optimized may be determined by calculating the cross-template matching errors for each parameter by itself (with all other weights set to zero) and selecting the parameter with the lowest error rate first, the next lowest error rate second, etc. The first parameter may be given a weight which is high enough so that the other weights will not range below one, thus enabling the use of integer arithmetic at greater speed than floating point arithmetic. Then, the optimization may be started with the second parameter weight.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus for producing output indicating words spoken by a human speaker, said apparatus comprising:
   means for detecting sounds, converting said sounds to electrical signals, analyzing said signals to detect for words, and then producing an electrical acoustic output signal representing at least one spoken word;
   means for scanning said speaker's face and producing electrical image signals, each said signal representing an image in a sequence of video images of said speaker;
   means, responsive to each said image signal, for tracking said speaker's mouth by tracking said speaker's nostrils;
   means for analyzing portions of said image signals, said portions defined by said means for tracking, to produce a video output signal representing at least one visual manifestation of at least one spoken word;
   means for receiving and correlating said acoustic output signal and said video output signal to produce said output.

2. The apparatus of claim 1, wherein:
   said means for tracking is responsive to more than one of said image signals.

3. The apparatus of claim 2, wherein:
   said means for tracking, means for analyzing said portions, and said means for receiving and correlating are together comprised of:
   a video processor, at least one computer means operably connected to said video processor and said means for detecting sounds, and at least one memory means accessible by said at least one computer means.

4. The apparatus of claim 3, wherein:
   said video processor is comprised of components including a camera control unit operably connected to said means for scanning, a window control unit, a grayscale threshold circuit, a video memory, a smooth and transition code circuit, a video control unit, and a controller, said components operably connected.

5. The apparatus of claim 1, wherein:
   said means for tracking, said means for analyzing said portions, and said means for receiving and correlating are together comprised of:
   a video processor, at least one computer means operably connected to said video processor and said means for detecting sounds and at least one memory means assessable by said at least one computer means.

6. The apparatus of claim 5, wherein:
   said video processor is comprised of components including a camera control unit operably connected to said means for scanning, a window control unit, a grayscale threshold circuit, a video memory, a smooth and transition code circuit, a video control unit, and a controller, said components operably connected.

7. An apparatus for producing output indicating words spoken by a human speaker, said apparatus comprising:
   an acoustic speech recognizer in operative combination with a microphone, for detecting sounds, converting said sounds to electrical signals, analyzing said electrical signals to detect for words, and then producing an electrical acoustic output signal representing an audio manifestation of spoken speech;
   means for scanning said speaker's face and producing electrical image signals, each said signal representing an image in a sequence of video images of said speaker;
   means for analyzing said image signals to produce respective location signals in response to a detection of said speaker's nostrils;
   means, activatable in response to one of said location signals, for defining a portion of one of said image signals for mouth analysis, said portion representing a region on said speaker's face located at a position determined by said speaker's nostrils;
   means for analyzing portions of said video image signals, responsive to said means for defining, to produce a video output signal, said video output signal representing a visual manifestation of speech;
   means for receiving and correlating said acoustic output signal and said video output signal to produce said output.

8. The apparatus of claim 7, wherein:
   said means for analyzing said image signals is responsive to said one of said image signals and is further responsive to a prior one of said image signals.

9. The apparatus of claim 8, wherein said means for analyzing respective portions of said video images is comprised of:
   memory means for storing a series of mouth information data sequences, said series of data sequence representing visual manifestations of spoken words;
   means for deriving mouth information data from said portions to form a second data sequence; and
   means for comparing each of said data sequences in said series with said second data sequence to produce said video output signals, wherein said means for comparing includes time warping means.

10. The apparatus of claim 7, wherein said means for analyzing respective portions of said video images is comprised of:

memory means for storing a series of mouth information data sequences, said series of data sequences representing visual manifestations of spoken words;

means for deriving mouth information data from said portions to form a second data sequence; and means for comparing each of said data sequences in said series with said second data sequence to produce said video output signals, wherein said means for comparing includes time warping means.

11. An apparatus for electronically detecting a speaker's facial features, the apparatus comprising:

means for producing electric signals corresponding to a sequence of video images of the speaker; and means, responsive to one of the signals corresponding to one image in the sequence, for finding the speaker's nostrils and then using the nostrils to define a region of the image for analyzing the speaker's mouth.

12. The apparatus of claim 11 wherein:
the region does not include the nostrils.

13. The apparatus of claim 11, further comprising:

means for comparing formations of the mouth in the regions in the sequence of images with data in a first computer memory to produce video speech recognition output;

means for detecting sound produced by the speaker, operatively connected to the means for comparing, to associate the detected sound produced by the speaker with data in a second computer memory to produce acoustic speech recognition output; and means, responsive to the video speech recognition output and the acoustic speech recognition output, for combining the outputs to recognize speech, wherein the data in at least one of the computer memories comprises speech syntax information.

14. The apparatus of claim 11, further comprising:

means for lipreading, responsive to a sequence of the regions and information in memory means, to produce output representing video speech recognition data.

15. The apparatus of claim 14, wherein the means for lipreading is comprised of:

means for defining mouth parameters, responsive to the regions in the sequence of video images.

16. The apparatus of claim 14, wherein the means for lipreading is comprised of:

means for defining region parameters relating to the speaker's mouth, responsive to the regions in the sequence of video images.

17. The apparatus of claim 14, wherein the means for lipreading is comprised of:

means for contour coding, responsive to the regions in the sequence of video images.

18. The apparatus of claim 14, wherein the means for lipreading is comprised of:

means for light intensity scale thresholding, responsive to the regions in the sequence of video images.

19. The apparatus of claim 14, wherein the means for lipreading is comprised of:

means for raster smoothing, responsive to the regions in the sequence of video images, to reduce video noise.

20. The apparatus of claim 14, wherein the means for lipreading is comprised of:

means for transition coding, responsive to the regions in the sequence of video images.

21. The apparatus of claim 14, wherein the means for lipreading is comprised of:

means for deriving mouth information time sequences, responsive to the regions in the sequence of video images, the time sequences each having a distance adjusted to standardize the time sequences with the data in the first computer memory.

22. The apparatus of claim 14, further comprising:

means for recognizing acoustic speech, to produce output representing acoustic speech recognition data; and means for combining said video speech recognition data with said acoustic speech recognition data to produce output indicating words spoken by said speaker.

23. The apparatus of claim 22, wherein the means for lipreading is comprised of:

means for defining mouth parameters, responsive to the regions in the sequence of video images.

24. The apparatus of claim 22, wherein the means for lipreading is comprised of:

means for defining region parameters relating to the speaker's mouth, responsive to the regions in the sequence of video images.

25. The apparatus of claim 22, wherein the means for lipreading is comprised of:

means for contour coding, responsive to the regions in the sequence of video images.

26. The apparatus of claim 22, wherein the means for lipreading is comprised of:

means for light intensity scale thresholding, responsive to the regions in the sequence of video images.

27. The apparatus of claim 22, wherein the means for lipreading is comprised of:

means for raster smoothing, responsive to the regions in the sequence of video images, to reduce video noise.

28. The apparatus of claim 22, wherein the means for lipreading is comprised of:

means for transition coding, responsive to the regions in the sequence of video images.

29. The apparatus of claim 22, wherein the means for lipreading is comprised of:

means for deriving mouth information time sequences, responsive to the regions in the sequence of video images, the time sequences each having a distance adjusted to standardize the time sequences with the data in the first computer memory.

30. The apparatus of claim 11, wherein the means for finding and the using is comprised of:

means, responsive to the one of the signals, for forming a data window in a subsequent one of the images in the sequence and limiting the means for finding and then using to searching for the nostrils within the data window of the subsequent image.

31. The apparatus of claim 30, further comprising:

means for comparing formations of the mouth in the regions in the sequence of images with data in a first computer memory to produce video speech recognition output;

means for detecting sound produced by the speaker, operatively connected to the means for comparing, to associate the detected sound produced by the speaker with data in a second computer memory to produce acoustic speech recognition output; and means, responsive to the video speech recognition output and the acoustic speech recognition output, for combining the outputs to recognize speech, wherein the data in at least one of the computer memories comprises speech syntax information.

32. The apparatus of claim 30, further comprising:
means for lipreading, responsive to a sequence of the regions and information in memory means, to produce output representing video speech recognition data.

33. The apparatus of claim 32, wherein the means for lipreading is comprised of:
means for defining mouth parameters, responsive to the regions in the sequence of video images.

34. The apparatus of claim 32, wherein the means for lipreading is comprised of:
means for defining region parameters relating to the speaker's mouth, responsive to the regions in the sequence of video images.

35. The apparatus of claim 32, wherein the means for lipreading is comprised of:
means for contour coding, responsive to the regions in the sequence of video images.

36. The apparatus of claim 32, wherein the means for lipreading is comprised of:
means for light intensity scale thresholding, responsive to the regions in the sequence of video images.

37. The apparatus of claim 32, wherein the means for lipreading is comprised of:
means for aster smoothing, responsive to the regions in the sequence of video images, to reduce video noise.

38. The apparatus of claim 32, wherein the means for lipreading is comprised of:
means for transition coding, responsive to the regions in the sequence of video images.

39. The apparatus of claim 32, wherein the means for lipreading is comprised of:
means for deriving mouth information time sequences, responsive to the regions in the sequence of video images, the time sequences each having a distance adjusted to standardize the time sequences with the data in the first computer memory.

40. The apparatus of claim 32, further comprising:
means for recognizing acoustic speech, to produce output representing acoustic speech recognition data; and
means for combining said video speech recognition data with said acoustic speech recognition data to produce output indicating words spoken by said speaker.

41. The apparatus of claim 40, wherein the means for lipreading is comprised of:
means for defining mouth parameters, responsive to the regions in the sequence of video images.

42. The apparatus of claim 40, wherein the means for lipreading is comprised of:
means for defining region parameters relating to the speaker's mouth, responsive to the regions in the sequence of video images.

43. The apparatus of claim 40, wherein the means for lipreading is comprised of:
means for contour coding, responsive to the regions in the sequence of video images.

44. The apparatus of claim 40, wherein the means for lipreading is comprised of:
means for light intensity scale thresholding, responsive to the regions in the sequence of video images.

45. The apparatus of claim 40, wherein the means for lipreading is comprised of:
means for raster smoothing, responsive to the regions in the sequence of video images, to reduce video noise.

46. The apparatus of claim 40, wherein the means for lipreading is comprised of:
means for transition coding, responsive to the regions in the sequence of video images.

47. The apparatus of claim 40, wherein the means for lipreading is comprised of:
means for deriving mouth information time sequences, responsive to the regions in the sequence of video images, the time sequences each having a distance adjusted to standardize the time sequences with the data in the first computer memory.

48. A method for producing output indicating words spoken by a human speaker, said method comprising steps of:
detecting sounds, converting said sounds to electrical signals, analyzing said signals to detect for words, and then producing an electrical acoustic output signal representing at least one spoken word;
scanning said speaker's face and producing electrical image signals, each said signal representing an image in a sequence of video images of said speaker;
tracking said speaker's mouth by tracking said speaker's nostrils;
analyzing portions of said image signals, said portions defined by said means for tracking, to produce a video output signal representing at least one visual manifestation of at least one spoken word;
receiving and correlating said acoustic output signal and said video output signal to produce said output.

49. The method of claim 48, wherein:
said tracking is responsive to more than one of said image signals.

50. The method of claim 49, wherein:
said steps of tracking, analyzing said portions, and receiving and correlating are together carried out with a video processor, at least one computer means operably connected to said video processor and said means for detecting sounds and at least one memory means accessible by said at least one computer means and said video processor.

51. The method of claim 50, wherein:
said steps of tracking, analyzing said portions, and receiving and correlating are together carried out with a video processor comprised of components including a camera control unit operably connected to said means for scanning, a window control unit, a grayscale threshold circuit, a video memory, a smooth and transition code circuit, a video control unit, and a controller, said components operably connected.

52. The method of claim 49, wherein:
said steps of tracking, analyzing said portions, and receiving and correlating are carried out with a video processor comprised of components including a camera control unit operably connected to said means for scanning, a window control unit, a grayscale threshold circuit, a video memory, a smooth and transition code circuit, a video control unit, and a controller, said components operably connected.

53. The method of claim 48, wherein:
said steps of tracking, analyzing said portions, and receiving and correlating are together carried out with a video processor, at least one computer means operably connected to said video processor and said means for detecting sounds, and at least one memory means accessible by said at least one computer means and said video processor.

54. A method for producing output indicating words spoken by a human speaker, said method comprising steps of:
- detecting sounds by means of an acoustic speech recognizer in operative combination with a microphone, converting said sounds to electrical signals, analyzing said electrical signals to detect for words, and then producing an electrical acoustic output signal representing an audio manifestation of spoken speech;
- scanning said speaker's face and producing electrical image signals, each said signal representing an image in a sequence of video images of said speaker;
- analyzing said image signals to produce respective location signals in response to a detection of said speaker's nostrils;
- defining a portion of one of said image signals for mouth analysis in response to one of said location signals, said portion representing a region on said speaker's face located at a position determined by said speaker's nostrils;
- analyzing portions of said video image signals, responsive to said step of defining, t produce a video output signal, said video output signal representing a visual manifestation of speech;
- receiving and correlating said acoustic output signal and said video output signal to produce said output.

55. The method of claim 54, wherein:
said step of analyzing said image signals is responsive to said one of said image signals and is further responsive to a prior one of said image signals.

56. The method of claim 55, wherein said step of analyzing respective portions of said video images is comprised of:
- storing a series of mouth information data sequences in memory means, said series of data sequences representing visual manifestations of spoken words;
- deriving mouth information data from said portions to form a derived data sequence; and
- comparing each of said data sequences in said series with said derived data sequence to produce said video output signals, wherein said step of comparing includes time warping to equalize the length of said derived data sequence with each of said data sequences in said series.

57. The method of claim 54, wherein said step of analyzing respective portions of said video images is comprised of:
- storing a series of mouth information data sequences in memory means, said series of data sequences representing visual manifestations of spoken words;
- deriving mouth information data from said portions to form a derived data sequence; and
- comparing each of said data sequences in said series with said derived data sequence to produce said video output signals, wherein said step of comparing includes time warping to equalize the length of said derived data sequence with each of said data sequences in said series.

58. A method for electronically detecting a speaker's facial features, the method comprising steps of:
- producing electric signals corresponding to a sequence of video images of the speaker; and
- finding the speaker's nostrils in one image in the sequence and then using the nostrils to automatically define a region of the image for analyzing the speaker's mouth.

59. The method of claim 58 wherein:
the region, defined in the step of using the nostrils, does not include the nostrils.

60. The method of claim 58, further comprising steps of:
- comparing formations of the mouth in the regions in the sequence of images with data in a first computer memory to produce video speech recognition output;
- detecting sound produced by the speaker and associating the detected sound produced by the speaker with data in a second computer memory to produce acoustic speech recognition output; and
- combining the outputs to recognize speech, responsive to the video speech recognition output and the acoustic speech recognition output, wherein the data in at least one of the computer memories comprises speech syntax information.

61. The method of claim 58, further comprising a step of:
lipreading, responsive to a sequence of the regions and information in memory means, to produce output representing video speech recognition data.

62. The method of claim 61, wherein the step of lipreading is comprised of:
defining mouth parameters, responsive to the regions in the sequence of video images.

63. The method of claim 61, wherein the step of lipreading is comprised of:
defining region parameters relating to the speaker's mouth, responsive to the regions in the sequence of video images.

64. The method of claim 61, wherein the step of lipreading is comprised of:
contour coding, responsive to the regions in the sequence of video images.

65. The method of claim 61, wherein the step of lipreading is comprised of:
light intensity scale thresholding, responsive to the regions in the sequence of video images.

66. The method of claim 61, wherein the step of lipreading is comprised of:
raster smoothing, responsive to the regions in the sequence of video images, to reduce video noise.

67. The method of claim 61, wherein the step of lipreading is comprised of:
transition coding, responsive to the regions in the sequence of video images.

68. The method of claim 61, wherein the step of lipreading is comprised of:
deriving mouth information time sequences, responsive to the regions in the sequence of video images, the time sequences each having a distance adjusted to standardize the time sequences with the data in the first computer memory.

69. The method of claim 61, further comprising steps of:
- recognizing acoustic speech, to produce output representing acoustic speech recognition data; and
- combining said video speech recognition data with said acoustic speech recognition data to produce output indicating words spoken by said speaker.

70. The method of claim 69, wherein the step of lipreading is comprised of:
defining mouth parameters, responsive to the regions in the sequence of video images.

71. The method of claim 69, wherein the step of lipreading is comprised of:
defining region parameters relating to the speaker's mouth, responsive to the regions in the sequence of video images.

72. The method of claim 69, wherein the step of lipreading is comprised of:
contour coding, responsive to the regions in the sequence of video images.

73. The method of claim 69, wherein the step of lipreading is comprised of:
light intensity scale thresholding, responsive to the regions in the sequence of video images.

74. The method of claim 69, wherein the step of lipreading is comprised of:
raster smoothing, responsive to the regions in the sequence of video images, to reduce video noise.

75. The method of claim 69, wherein the step of lipreading is comprised of:
transition coding, responsive to the regions in the sequence of video images.

76. The method of claim 69, wherein the step of lipreading is comprised of:
deriving mouth information time sequences, responsive to the regions in the sequence of video images, the time sequences each having a distance adjusted to standardize the time sequences with the data in the first computer memory.

77. The method of claim 58, wherein:
the steps of finding and than using are together comprised of:
forming, responsive to the one of the signals, a data window in a subsequent one of the images in the sequence and limiting the finding and then using steps to searching for the nostrils within the data window of the subsequent image.

78. The method of claim 77, further comprising steps of:
comparing formations of the mouth in the regions in the sequence of images with data in a first computer memory to produce video speech recognition output;
detecting sound produced by the speaker and associating the detected sound produced by the speaker with data in a second computer memory to produce acoustic speech recognition output; and
combining the video speech recognition output and the acoustic speech recognition output to recognize speech with the data in at least one of the computer memories comprising speech syntax information.

79. The method of claim 77, further comprising a step of:
lipreading, responsive to a sequence of the regions and information in memory means, to produce output representing video speech recognition data.

80. The method of claim 79, wherein the step of lipreading is comprised of:
defining mouth parameters, responsive to the regions in the sequence of video images.

81. The method of claim 79, wherein the step of lipreading is comprised of:
defining region parameters relating to the speaker's mouth, responsive to the regions in the sequence of video images.

82. The method of claim 71, wherein the step of lipreading is comprised of:
contour coding, responsive to the regions in the sequence of video images.

83. The method of claim 79, wherein the step of lipreading is comprised of:
light intensity scale thresholding, responsive to the regions in the sequence of video images.

84. The method of claim 79, wherein the step of lipreading is comprised of:
raster smoothing, responsive to the regions in the sequence of video images, to reduce video noise.

85. The method of claim 79, wherein the step of lipreading is comprised of:
transition coding, responsive to the regions in the sequence of video images.

86. The method of claim 79, wherein the step of lipreading is comprised of:
deriving mouth information time sequences, responsive to the regions in the sequence of video images, the time sequences each having a distance adjusted to standardize the time sequences with the data in the first computer memory.

87. The method of claim 79, further comprising steps of:
recognizing acoustic speech, to produce output representing acoustic speech recognition data; and
combining said video speech recognition data with said acoustic speech recognition data to produce output indicating words spoken by said speaker.

88. The method of claim 87, wherein the step of lipreading is comprised of:
defining mouth parameters, responsive to the regions in the sequence of video images.

89. The method of claim 87, wherein the step of lipreading is comprised of:
defining region parameters relating to the speaker's mouth, responsive to the regions in the sequence of video images.

90. The method of claim 87, wherein the step of lipreading is comprised of:
contour coding, responsive to the regions in the sequence of video images.

91. The method of claim 87, wherein the step of lipreading is comprised of:
light intensity scale thresholding, responsive to the regions in the sequence of video images.

92. The method of claim 87, wherein the step of lipreading is comprised of:
raster smoothing, responsive to the regions in the sequence of video images, to reduce video noise.

93. The method of claim 87, wherein the step of lipreading is comprised of:
transition coding, responsive to the regions in the sequence of video images.

94. The method of claim 87, wherein the step of lipreading is comprised of:
deriving mouth information time sequences, responsive to the regions in the sequence of video images, the time sequences each having a distance adjusted to standardize the time sequences with the data in the first computer memory.

* * * * *